United States Patent [19]

Watanabe et al.

[11] Patent Number: 4,803,597
[45] Date of Patent: Feb. 7, 1989

[54] ELECTRIC DOUBLE-LAYER CAPACITOR

[75] Inventors: Kouichi Watanabe; Michinobu Maesaka; Michihiro Murata, all of Kyoto, Japan

[73] Assignee: Murata Manufacturing Co., Ltd., Japan

[21] Appl. No.: 145,530

[22] Filed: Jan. 19, 1988

[30] Foreign Application Priority Data

Jan. 21, 1987 [JP] Japan .................................. 62-12972

[51] Int. Cl.4 .............................................. H01G 9/00
[52] U.S. Cl. .................................................... 361/502
[58] Field of Search ............................ 361/433 M, 434

[56] References Cited

U.S. PATENT DOCUMENTS

| 3,555,369 | 1/1971 | Yoshino | 361/433 |
| 3,656,027 | 4/1972 | Isley | 261/433 |
| 4,408,259 | 10/1983 | Muranaka et al. | 361/434 |
| 4,683,516 | 7/1987 | Miller | 361/433 X |

FOREIGN PATENT DOCUMENTS

| 163617 | 7/1986 | Japan . |
| 163618 | 7/1986 | Japan . |
| 163619 | 7/1986 | Japan . |
| 163620 | 7/1986 | Japan . |

Primary Examiner—Donald A. Griffin
Attorney, Agent, or Firm—Ostrolenk, Faber, Gerb & Soffen

[57] ABSTRACT

An electric double-layer capacitor has at least one or two elements. Each element includes a charge storage part, a pair of collectors arranged to hold the charge storage part, and a gasket enclosing the charge storage part and being arranged between the collectors to be thermally adhered to the collectors. Each collector is formed from a conductive polyethylene sheet which is provided with conductivity by a carbon material and has a multi-layer structure including polyethylene materials of different density levels.

13 Claims, 1 Drawing Sheet

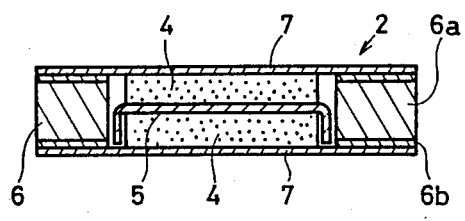
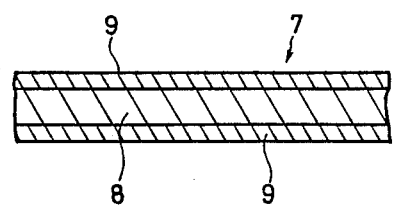
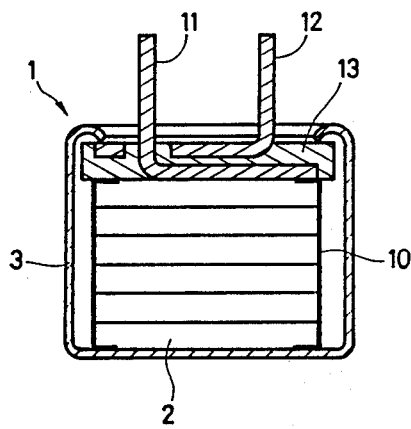
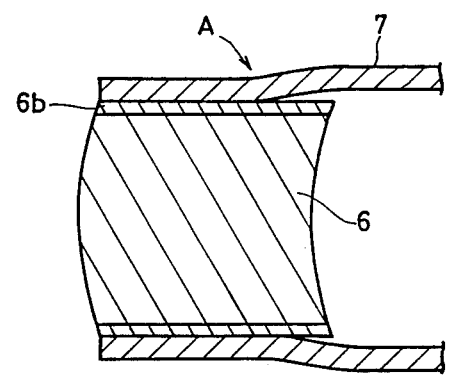
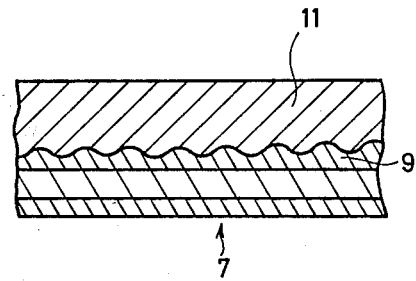

ELECTRIC DOUBLE-LAYER CAPACITOR

BACKGROUND OF THE INVENTION

1. Field of the Invention

The present invention relates to an electric double-layer capacitor, and more particularly, it relates to an electric double-layer capacitor having collectors prepared from conductive resin films.

2. Description of the Prior Art

Japanese Patent Laying-Open Nos. 163617/1986, 163618/1986, 163619/1986 and 163620/1986 disclose that an element for a conventional electric double-layer capacitor is formed by a gasket and collectors, which are sealed by a thermo-adhesion method. Each of the collectors is prepared from conductive film which is obtained by inflation molding or T-die extrusion molding of low-density polyethylene or high-density polyethylene which is provided with conductivity by a carbon material mainly composed of carbon black.

However, a collector prepared from low-density polyethylene easily obtains pinholes in the thermo-adhesion process. Further, when the collector is left for a long period of time, the electrolytic solution gradually infiltrates into the same to corrode metal parts in contact with the collector, in the worst case.

In a collector prepared from high-density polyethylene, on the other hand, the equivalent series resistance is greatly increased. Further, the conductive film of high-density polyethylene is fragile and easily broken, particularly since variations in the thickness of the components and that variations in applied pressure following storage in a case cannot be avoided.

SUMMARY OF THE INVENTION

An object of the present invention is to improve the collectors of an electric double-layer capacitor, thereby to provide the same with good thermo-adhesive properties and excellent heat resistance.

Another object of the present invention is to prevent degradation of the collectors caused by the thermo-adhesion process and reduce crack initiation caused by stress applied after the thermo-adhesion.

According to the present invention, an electric double-layer capacitor has at least one or two electric double-layer capacitor elements. Each of the electric double-layer capacitor elements includes a charge storage part, a pair of collectors which are arranged to hold the charge storage part, and a gasket enclosing the charge storage part which is arranged between the collectors and thermally adhered to the collectors. Each of the collectors is formed from a conductive polyethylene sheet which is provided with conductivity by a carbon material and has a multi-layer structure including polyethylene materials of different density levels.

Preferably, the conductive polyethylene sheet has a low-density polyethylene layer at least on one of its outer surfaces. Preferably, the conductive polyethylene sheet is a three-layer structure consisting of a substrate of high-density polyethylene and layers of a polyethylene material selected from the group consisting of low-density polyethylene, linear low-density polyethylene, middle-density polyethylene, and mixtures thereof, which layers are formed on both surfaces of the substrate. Preferably, each of the collectors includes a core member serving as a substrate of high-density polyethylene which is made conductive by carbon black and low-density polyethylene layers, which are integrally formed on both surfaces of the core member, and which are made conductive by carbon black. Preferably, the gasket is formed by integrally forming low-density polyethylene layers, which are to be adhered to collectors, on both surfaces thereof. Preferably, the charge storage part includes a pair of polarizable electrodes which are arranged in a central portion and a separator for separating the polarizable electrodes from each other. Or, preferably the charge storage part further includes an electrolytic solution which is impregnated into the polarizable electrodes and the separator, while the separator is formed from a film having a dish-shaped peripheral edge portion and the polarizable electrodes are formed from solid carbonaceous compacts. Preferably the electric double-layer capacitor further includes a cup-shaped case, to store a plurality of electric double-layer capacitor elements which are stacked with each other.

In the inventive electric double-layer capacitor, each collector has a multi-layer structure including polyethylene materials having different density levels, which have a plurality of properties which vary with the density levels. Thus, when the collector is prepared from high-density polyethylene and low-density polyethylene, for example, the electric double-layer capacitor is provided with the property of the high-density polyethylene which has a high thermal deformation temperature and sufficient sulfate resistance, and the property of the low-density polyethylene which is excellent in thermo-adhesive property and flexibility.

Further, contact resistance is reduced if the surface layers of the conductive polyethylene sheet are prepared from low-density polyethylene to be provided with flexibility. In addition, diffusion of sulfuric acid into the sheet is reduced if the conductive polyethylene sheet includes a high-density polyethylene layer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a longitudinal sectional view showing an element for an electric double-layer capacitor according to the present invention;

FIG. 2 is a longitudinal sectional view showing the entire electric double-layer capacitor;

FIG. 3 is a partially enlarged longitudinal sectional view showing a collector;

FIG. 4 is a partially enlarged view showing parts of two collectors adhered to a gasket; and FIG. 5 is an enlarged view showing a contact part between a collector and a metal plate.

DESCRIPTION OF THE PREFERRED EMBODIMENT

FIG. 1 is a longitudinal sectional view showing an individual element to be included in an electric double-layer capacitor according to an embodiment of the present invention, and FIG. 2 is a longitudinal sectional view showing the entire electric double-layer capacitor.

As shown in FIG. 2, six discoidal elements 2 are coaxially stacked and stored in a cup-shaped case 3, to form an electric double-layer capacitor 1. Each element 2 has a pair of polarizable electrodes 4 provided in its central portion, a separator 5 for separating the same from each other, an annular gasket 6 and a pair of collectors 7 which are thermally adhered to upper and lower parts of the gasket 6, as shown in FIG. 1.

The gasket 6 is formed by integrating low-density polyethylene layers 6b with both surfaces of a substrate 6a of ethylene propylene vulcanized rubber. The polarizable electrodes 4 are located in the central opening in the gasket 6, and separated from each other by the separator 5. The separator 5 is prepared from a polyolefin microporous film or nonwoven fabric, to have a dish-shaped peripheral edge portion. Such a dish-shaped portion is adapted to cover one of the polarizable electrodes 4, thereby to prevent shorting between the two polarizable electrodes 4. The polarizable electrodes 4 are prepared from solid carbonaceous compacts, such as those obtained by adding chlorosulfonated polyethylene to active carbon powder as a binder and pressure-molding the same, or by punching cloth of active carbon fiber. The separator 5 and the polarizable electrodes 4 are generally impregnated with an electrolytic solution containing 50 percent by weight of dilute sulfuric acid, for example.

The collectors 7, which are adapted to airtightly seal the polarizable electrodes 4, are prepared from polyethylene films which are provided with conductivity from a carbon material. In more concrete terms, each of the collectors 7 is prepared from a conductive film of three-layer structure obtained by integrally forming low-density polyethylene layers 9, which are made conductive by carbon black, on both surfaces of a core member 8, serving as a substrate, of high-density polyethylene which is made conductive by carbon black. Thus, the core member 8 of the collector 7 has a high thermal deformation temperature, sufficient sulfate resistance and low diffusivity. Further, the polyethylene layers 9 forming the outer surfaces of the collector 7 are excellent in thermo-adhesive property and high in flexibility. Thus, the collector 7 has good thermo-adhesive properties and excellent heat resistance, to facilitate thermo-adhesion. Further, degradation by the thermo-adhesion process is small and crack initiation caused by stress applied thereafter is greatly reduced, while contact resistance is low since the surface layers of the collector 7 are prepared from a flexible material. In addition, the collector 7 is excellent in chemical resistance since the same is entirely formed from polyethylene and carbon, and diffusivity in the sheet is low since the same includes the high-density polyethylene layer, which has high crystallinity.

Such elements 2 are stacked in the required number (e.g., 6), depending on the rated voltage, as shown in FIG. 2, and the periphery of the stacked assembly is contracted and integrated by an insulating thermal contraction tube 10, and the assembly is stored in a can case 3 in a pressurized state. Numerals 11 and 12 indicate metal plates whose projecting parts are raised up to serve as terminals, which are assembled with each other by an insulating plate 13.

The operation of this embodiment will now be described. As seen in FIG. 4, showing an enlarged view of thermally adhered parts of the gasket 6 and the collectors 7, each collector 7 is deflected at a portion A between the part adhered to the gasket 6 and the central part of the gasket 6. In general, such a deflected portion A of the collector 7 could be microscopically cracked in thermo-adhesion, and such cracking could grow in response to pressure deformation to cause breakage of the collector 7. In the conductive film of three-layer structure according to this embodiment, however, the high-density polyethylene layer forming the core member 8 is not degraded since the low-density polyethylene layers 9 forming the surfaces alone are welded thereto by thermo-adhesion. Further, the flexible low-density polyethylene layers 9 function to relax any distortion caused by pressure deformation, thereby preventing cracking. The collectors 7 and the gasket 6 are successfully thermally adhered to each other since the contact portions of the same are prepared from low-density polyethylene, and no pinholes are caused since the high-density polyethylene layer is not melted or softened at this time. Further, high-density polyethylene has sufficient sulfate resistance even if the same is provided in the form of a thin film, and diffusion of the sulfuric acid, which is filled in the element 2 as the electrolytic solution, is extremely small since the high-density polyethylene layer serves as a blocking layer for preventing the metal parts which are in contact with the element 2, from discoloration and rust.

The function of the electric double-layer capacitor of this embodiment will now be described with reference to Examples, in comparison with prior art examples.

EXAMPLE 1

Capacitor elements 2 were prepared according to this embodiment and according to the aforementioned prior art. Each element 2 as shown in FIG. 1 was prepared having collectors 7 formed from films (80 $\mu$m in thickness) of low-density polyethylene and/or high-density polyethylene, whose volume resistivity was adjusted to be 40 to 60 $\Omega \bullet$cm through addition of carbon black. Six such elements 2 were stacked to form an electric double-layer capacitor 1 of 5.5 V in rated voltage and 0.1 F as shown in FIG. 2, and the equivalent series resistance across the terminals was measured.

In the conventional electric double-layer capacitor employing only high-density polyethylene films, such resistance was at an abnormally high value of 46 $\Omega$. This is interpreted as being caused by the surfaces of the can case 3 and the metal plate 11, which are in contact with the elements 2, being finely irregularized on a microscopic level. Hence the collectors 7 are not conformable to such surfaces, whereby the contact areas are reduced to increase contact resistance. On the other hand, such equivalent series resistance was 12 $\Omega$ in the capacitors according to this Example. It can be considered that this is because the surface layers of the collectors 7, being prepared from flexible low-density polyethylene, are conformable to the surfaces of the can case 3 and the metal plate 11 (refer to FIG. 5).

EXAMPLE 2

Various types of conductive polyethylene films as listed in Table 1 were prepared from four types of master batches, which were prepared by filling carbon black in high-density, middle-density, low-density and linear low-density polyethylene materials. With reference to Table 1, symbol HD indicates high-density polyethylene, symbol MD indicates middle-density polyethylene, symbol LD indicates low-density polyethylene and symbol L-LD indicates linear low-density polyethylene. The expressions are along sequence of stacking from outer side surfaces of the elements. All of the films were 80±4 $\mu$m in thickness and 40 to 60 $\Omega \bullet$cm in volume resistivity (SRIS-2301). Each pair of such films were employed as collectors 7 to prepare an element 2 as shown in FIG. 1. Six such elements 2 were stacked and stored in a can case 3 as shown in FIG. 2, to form an electric double-layer capacitor 1 of 5.5 V in rated voltage and 0.1 F.

As to the products thus obtained and the processes of manufacturing the same, Table 1 shows the results of evaluation of the following four items:

(1) Thermo-adhesive property based on adhesive failure or the degree of occurrence of pinholes;

(2) Chemical resistance based on the degree of degradation of the collector surfaces and the degree of decolorization of the can case 3 and the metal plate 11 observed after leaving each product at 85° C. for 1000 hours;

(3) Equivalent series resistance across terminals of each product; and (4) Breakability based on the degree of occurrence of cracking and necking in the collectors 7 observed through decomposition after leaving each product at 85° C. for 1000 hours.

TABLE 1

| | Structure | Composition | Evaluation Item | | | |
|---|---|---|---|---|---|---|
| | | | (1) | (2) | (3) | (4) |
| Examples | Three-Layer Symmetrical Structure | L — LD(10μ) + HD(60μ) + L — LD(10μ) | ⊙ | ⊙ | ⊙ | ○ |
| | | L — LD(15μ) + HD(50μ) + L — LD(15μ) | ⊙ | ⊙ | ⊙ | ⊙ |
| | | LD(10μ) + HD(60μ) + LD(10μ) | ⊙ | ⊙ | ⊙ | ○ |
| | | LD(15μ) + HD(50μ) + LD(15μ) | ⊙ | ⊙ | ⊙ | ⊙ |
| | | MD(15μ) + HD(50μ) + HD(15μ) | ⊙ | ⊙ | ○ | ○ |
| Prior Art | Single-Layer Structure | HD(80μ) | △ | ⊙ | X | X |
| | | LD(80μ) | X | X | ⊙ | △ |

Referring to Table 1, symbol ⊙ indicates 0/100, symbol ○ indicates 1 to 5/100, symbol △ indicates 6 to 50/100 and symbol X indicates at least 51/100 in degree of occurrence of adhesive failure or pinholes, as to the item (1) of thermo-adhesive property. As to the item (2) of chemical resistance, symbol ⊙ indicates "no discoloration", symbol ○ indicates "slightly discolored (with glossiness)", symbol △ indicates "rusted (with no glossiness)" and symbol X indicates "extremely rusted". As to the item (3) of equivalent series resistance, symbol ⊙ indicates not more than 14Ω, symbol ○ indicates 15 to 24 Ω, symbol △ indicates 25 to 50 Ω and symbol X indicates at least 51 Ω. As to the item (4) of breakability, symbol ⊙ indicates 0/100, symbol ○ indicates 1/100, symbol △ indicates 2 to 50/100 and symbol X indicates at least 51/100 in degree of occurrence.

The collector according to the present invention is not restricted to the three-layer structure as hereinabove described, but may be provided with, e.g., a five-layer structure such as: (1) low-density polyethylene, middle-density polyethylene, high-density polyethylene, middle-density polyethylene and low-density polyethylene, (2) middle-density polyethylene, low-density polyethylene, high-density polyethylene, low-density polyethylene and middle-density polyethylene, or (3) low-density polyethylene, high-density polyethylene, middle-density polyethylene, high-density polyethylene and low-density polyethylene, or in another type of multi-layer structure.

The thermo-adhesion method is not restricted to the heat seal method, but an impulse seal method or an ultrasonic adhesion method may be employed. Further, graphite may be employed as conductivity supplier.

According to the present invention as hereinabove described, each collector is prepared from a conductive polyethylene sheet which is provided with conductivity by a carbon material and has a multi-layer structure including polyethylene materials having different density levels, so that the collector has a plurality of types of properties depending on the density levels. Thus, the electric double-layer capacitor according to the present invention can be provided with good thermo-adhesive property and excellent heat resistance, for example. Degradation by thermo-adhesion can be reduced, and crack initiation caused by stress applied thereafter can be greatly reduced. Further, contact resistance can be reduced by making the surface layers of the collector by a flexible material, while diffusion of an electrolytic solution into the collector can be suppressed by a blocking layer. In addition, chemical resistance is excellent since the collector is formed from polyethylene and carbon.

Although an embodiment of the present invention has been described and illustrated in detail, it is clearly understood that the same is by way of illustration and example only and is not to be taken by way of limitation, the scope of the present invention being limited only by the terms of the appended claims.

What is claimed is:

1. An electric double-layer capacitor having one or more electric double-layer capacitor elements,
    each of said electric double-layer capacitor elements including:
    a charge storage part;
    a pair of collectors arranged to hold said charge storage part, each of said collectors having a multi-layer structure including a plurality of conductive polyethylene layers provided with conductivity by a carbon material, said polyethylene layers comprising respective polyethylene materials having different density levels; and
    a gasket enclosing said charge storage part and being arranged between and adhered to said collectors.

2. An electric double-layer capacitor in accordance with claim 1, wherein
    said multi-layer structure of said collectors has a low-density polyethylene layer on at least one of its outer surfaces.

3. An electric double-layer capacitor in accordance with claim 1, wherein
    said multi-layer structure is a three-layer structure comprising a substrate of high-density polyethylene, and outer layers provided on both surfaces of said substrate, said outer layers comprising a polyethylene material selected from the group consisting of low-density polyethylene, linear low-density polyethylene, middle-density polyethylene, and mixtures thereof.

4. An electric double-layer capacitor in accordance with claim 1, wherein each said collector includes a core member serving as a substrate comprising high-density polyethylene, said core member being made conductive by carbon black, and low-density polyethylene layers which are made conductive by carbon black and integrally provided on both surfaces of said core member.

5. An electric double-layer capacitor in accordance with claim 1, wherein
said gasket has integral low-density polyethylene layers, which are adhered to said collectors, formed on both surfaces thereof.

6. An electric double-layer capacitor in accordance with claim 1, wherein
said charge storage part includes a pair of polarizable electrodes and is provided in its central portion with a separator for separating said polarizable electrodes from each other.

7. An electric double-layer capacitor in accordance with claim 6, wherein
said charge storage part further includes an electrolytic solution impregnated into said polarizable electrodes and said separator,
said separator is formed from a film having a dish-shaped peripheral edge portion, and
said polarizable electrodes are formed from solid carbonaceous compacts.

8. An electric double-layer capacitor in accordance with claim 1, further including a cup-shaped case,
a plurality of said electrolytic double-layer capacitor elements being stacked and contained in said case.

9. An electric double-layer capacitor in accordance with claim 1, wherein said gasket is thermally adhered to said collectors.

10. An electric double-layer capacitor in accordance with claim 1, wherein
said multi-layer structure is a five-layer structure comprising five polyethylene layers, each said layer comprising a polyethylene material selected from the group consisting of low-density polyethylene, linear low-density polyethylene, middle-density polyethylene, and high-density polyethylene, and mixtures thereof.

11. An electric double-layer capacitor in accordance with claim 10, wherein said five polyethylene layers respectively comprise low-density polyethylene, middle-density polyethylene, high-density polyethylene, middle-density polyethylene, and low-density polyethylene.

12. An electric double-layer capacitor in accordance with claim 10, wherein said five polyethylene layers respectively comprise middle-density polyethylene, low-density polyethylene, high-density polyethylene, low-density polyethylene, and middle-density polyethylene.

13. An electric double-layer capacitor in accordance with claim 10, wherein said five polyethylene layers respectively comprise low-density polyethylene, high-density polyethylene, middle-density polyethylene, high-density polyethylene, and low-density polyethylene.

* * * * *